(12) United States Patent
Kim et al.

(10) Patent No.: US 7,847,880 B2
(45) Date of Patent: Dec. 7, 2010

(54) LIGHT GUIDING PLATE WITH REFRACTIVE MEMBER, BACKLIGHT ASSEMBLY HAVING THE SAME, AND DISPLAY DEVICE HAVING THE SAME

(75) Inventors: Joong-Hyun Kim, Suwon-si (KR); In-Sun Hwang, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 406 days.

(21) Appl. No.: 11/453,223

(22) Filed: Jun. 14, 2006

(65) Prior Publication Data

US 2006/0279672 A1    Dec. 14, 2006

(30) Foreign Application Priority Data

Jun. 14, 2005    (KR) .................. 10-2005-0050792

(51) Int. Cl.
G02F 1/1335    (2006.01)
F21V 7/04    (2006.01)
G09G 3/34    (2006.01)

(52) U.S. Cl. .............. 349/61; 349/62; 349/63; 349/64; 349/65; 362/615; 362/617; 362/618; 362/619; 362/620; 345/84

(58) Field of Classification Search .......... 349/9, 349/61, 62, 63, 65, 67; 362/615–620; 345/84, 345/87
See application file for complete search history.

(56) References Cited

U.S. PATENT DOCUMENTS

| | | | |
|---|---|---|---|
| 6,025,897 A * | 2/2000 | Weber et al. .......... 349/96 |
| 6,191,833 B1 * | 2/2001 | Hirakata .............. 349/61 |
| 6,222,598 B1 * | 4/2001 | Hiyama et al. ........ 349/65 |
| 6,234,639 B1 * | 5/2001 | Noguchi .............. 362/600 |
| 6,239,851 B1 * | 5/2001 | Hatazawa et al. ...... 349/62 |
| 6,352,350 B1 | 3/2002 | Ma ..................... 362/19 |
| 6,384,881 B1 | 5/2002 | Arai et al. |
| 6,469,755 B1 | 10/2002 | Adachi et al. ......... 349/62 |
| 6,906,348 B2 * | 6/2005 | Sugiura ................ 257/72 |
| 6,960,010 B2 * | 11/2005 | Matsumoto et al. ..... 362/609 |
| 7,006,173 B1 * | 2/2006 | Hiyama et al. ......... 349/96 |
| 2004/0105251 A1 | 6/2004 | Yu et al. |
| 2005/0163971 A1 * | 7/2005 | Kobayashi et al. ..... 428/156 |

FOREIGN PATENT DOCUMENTS

| | | |
|---|---|---|
| CN | 1506733 | 6/2004 |
| JP | 09-138406 | 5/1997 |
| JP | 10-319393 | 12/1998 |
| JP | 11-064840 | 3/1999 |
| JP | 11-174230 | 7/1999 |
| JP | 11326887 | 11/1999 |
| JP | 2001-343612 | 12/2001 |
| JP | 2002-098962 | 4/2002 |

(Continued)

Primary Examiner—Hoan C Nguyen
(74) Attorney, Agent, or Firm—Cantor Colburn LLP (57) ABSTRACT

A light guiding plate, a backlight assembly having the light guiding plate and a display device having the backlight assembly include a light guiding plate body, a polarization transformation layer on a surface of the light guiding plate body to transform a polarization component of light emitted through the light guiding plate, and a polarization extraction layer on the polarization transformation layer.

47 Claims, 9 Drawing Sheets

FOREIGN PATENT DOCUMENTS

| | | |
|---|---|---|
| JP | 2003-295183 | 10/2003 |
| JP | 2004-133318 | 4/2004 |
| KR | 10-0230884 | 8/1999 |
| KR | 10200000055799 | 9/2000 |
| KR | 1020020088445 | 11/2002 |
| KR | 2003-0068568 | 8/2003 |
| KR | 2004-0012894 | 2/2004 |
| KR | 2004-0086288 | 10/2004 |

* cited by examiner

LIGHT GUIDING PLATE WITH REFRACTIVE MEMBER, BACKLIGHT ASSEMBLY HAVING THE SAME, AND DISPLAY DEVICE HAVING THE SAME

The present application claims priority to Korean Patent Application No. 2005-0050792, filed on Jun. 14, 2005, and all the benefits accruing therefrom under 35 U.S.C. §119, and the contents of which in its entirety are herein incorporated by reference.

BACKGROUND OF THE INVENTION (a) Field of the Invention

The present invention relates to a light guiding plate, a backlight assembly having the light guiding plate and a display device having the backlight assembly, and more particularly to, a light guiding plate capable of performing polarization transformation and polarization extraction, a backlight assembly having the light guiding plate and a display device having the backlight assembly.

(b) Description of the Related Art

As semiconductor techniques are rapidly developed, the demand for lightweight, compact liquid crystal display ("LCD") devices increases greatly. An LCD is thin, lightweight, and has low power consumption compared to a cathode ray tube ("CRT"). For these reasons, LCDs are used extensively in a variety of applications as a substitute for a conventional CRT. Recently, LCD devices have been used as display devices for many information processing devices, such as display monitors, portable computer displays, desktop computer displays, high definition ("HD") imaging systems, and the like.

In the LCD device, alignment of liquid crystal molecules is generally changed by applying voltages to the liquid crystal ("LC") molecules. The change in alignment of the LC molecules results in a change in optical characteristics of liquid crystal cells such as birefringence, optical rotation, dichromatism and light scattering. By using the change in optical characteristics of the liquid crystal cells, an image can be displayed on the LCD device. The LCD device is a non-emission type apparatus which displays information by using optical modulation of the liquid crystal cells.

The LCD device includes an LCD panel and two polarization plates, which are attached on both surfaces of the LCD panel to polarize light. The polarization plates pass only the light having a predetermined polarization direction. The polarization includes P and S polarization components. The P polarization component denotes polarization of which a direction is perpendicular to a formation direction of a lattice structure of a respective polarization plate, and the S polarization component denotes polarization of which a direction is parallel to the formation direction of a lattice structure of a respective polarization plate.

Since half of the entire light incident on the LCD panel is removed by the corresponding polarization plate, only the polarized light, which is oriented along a predetermined direction, can be used by the LCD panel. Accordingly, the entire light incident on the liquid crystal display panel cannot be used, so that light efficiency decreases greatly.

In order to solve the above problem, a technique for increasing the light efficiency by modifying optical sheets has been researched. Namely, the optical sheets are modified to transform the polarization so as to increase the light efficiency. However, a plurality of the optical sheets are assembled together, so that fine gaps are formed between the optical sheets. Therefore, there is a limitation to the polarization transformation. In particular, due to the fine gaps, the light is subject to birefringence, so that the polarization transformation is not easily performed. As a result, although the optical sheets having a function of the polarization transformation, the polarization transformation efficiency is not very large due to the fine gaps between the optical sheets.

In addition, it is still difficult to assemble a plurality of the thin optical sheets together. Therefore, manufacturing productivity of the LCD device decreases.

BRIEF SUMMARY OF THE INVENTION

The present invention provides a light guiding plate capable of performing polarization transformation and polarization extraction.

The present invention also provides a backlight assembly capable of improving light efficiency by effectively using a polarization component.

The present invention also provides a display device having the backlight assembly.

According to an exemplary embodiment of the present invention, a light guiding plate includes: a light guiding plate body; a polarization transformation layer on a surface of the light guiding plate body to transform a polarization component of light emitted through the light guiding plate; and a polarization extraction layer on the polarization transformation layer.

According to another exemplary embodiment of the present invention, a backlight assembly includes: a light source; and a light guiding plate for guiding light emitted from the light source, wherein the light guiding plate includes: a light guiding plate body; a polarization transformation layer on a surface of the light guiding plate body to transform a polarization component of light emitted through the light guiding plate; and a polarization extraction layer on the polarization transformation layer.

According to yet another exemplary embodiment of the present invention, a display device includes: a panel unit for displaying an image; a light source for supplying light to the panel unit; and a light guiding plate for guiding light emitted from the light source, wherein the light guiding plate includes: a light guiding plate body; a polarization transformation layer on a surface of the light guiding plate body to transform a polarization component of light emitted through the light guiding plate; and a polarization extraction layer on the polarization transformation layer.

In the aforementioned exemplary embodiments of the present invention, the polarization transformation layer may transform a P polarization component into a sum of P and S polarization components.

In addition, the polarization transformation layer may allow the light to be subject to birefringence.

In addition, the polarization transformation layer may be a retardation film.

In addition, the retardation film may include at least one resin selected from a group consisting of poly ethylene terephthalate (PET) and poly ethylene naphthalate (PEN).

In addition, a plurality of refractive members may be disposed on the surface of the light guiding plate body to be separated from each other and extend in a predetermined direction.

In addition, a height of each of the refractive members may be in a range from about 5 μm to about 12 μm.

In addition, a vertex angle of the refractive member may be in a range from about 30° to about 70°.

In addition, a pitch of the refractive members may be in a range from about 10 μm to about 100 μm.

In addition, the height of each of the refractive members may be larger than a thickness of the polarization extraction layer.

In addition, the light source and a plurality of the refractive members may be disposed to extend in the same direction.

In addition, the polarization transformation layer may have a plurality of refractive indexes varying according to direction.

In addition, a difference between first and second refractive indexes among the refractive indexes may be in a range from about 0.01 to about 0.50.

In addition, the first refractive index may be in a range from about 1.0 to about 2.0.

In addition, the second refractive index may be in a range from about 1.0 to about 2.5.

In addition, the polarization extraction layer may include a plurality of liquid crystal polymers ("LCP").

In addition, the polarization transformation layer may pass only an S polarization component.

In addition, the backlight assembly may further include a protective layer on the polarization extraction layer to protect the polarization extraction layer.

In addition, a plurality of prisms may be disposed on a surface opposite to the surface of the light guiding plate body.

In addition, the light source is a lamp.

In addition, the light source may be a linear light source including light emitting diodes.

In addition, the polarization transformation layer may pass only an S polarization component.

In addition, the light guiding plate may further include a protective layer on the polarization extraction layer to protect the polarization extraction layer.

In addition, the panel unit may be a liquid crystal display panel.

In addition, the panel unit may be disposed to directly face the light guiding plate.

DETAILED DESCRIPTION OF THE INVENTION

Figure 1:
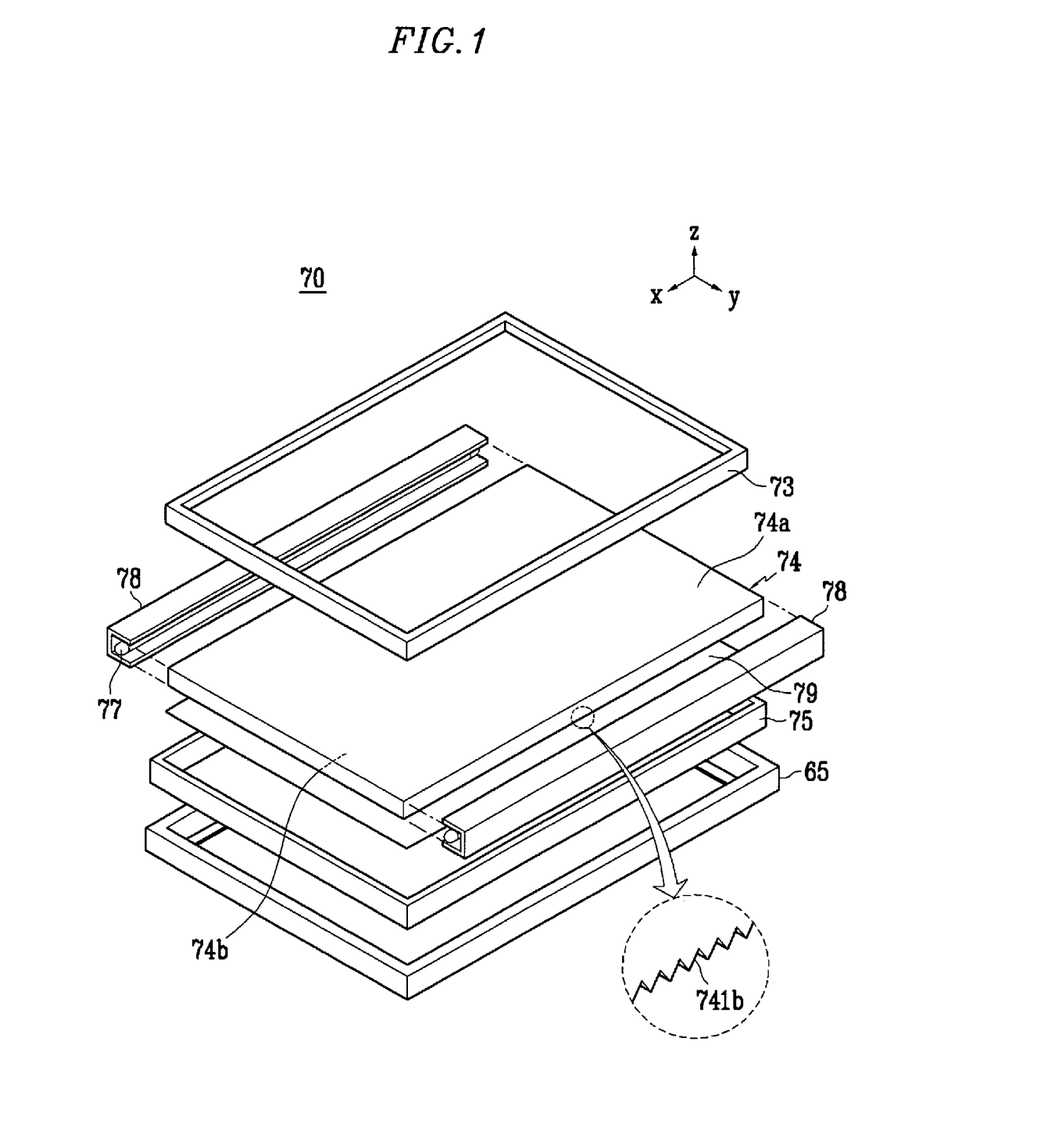
FIG. 1 is a perspective exploded view of an exemplary embodiment of a backlight assembly according to the present invention.

FIG. 1 is a perspective exploded view illustrating an exemplary embodiment of a backlight assembly 70 according to the present invention. In FIG. 1, an enlarged circle shows an enlarged view of a lower edge of a light guiding plate 74.

As shown in FIG. 1, the backlight assembly 70 includes a light source 77, a light source cover 78, a light guiding plate 74 and a reflecting sheet 79 or the like. The backlight assembly may further include other components as needed. The above enumerated components are contained in a bottom chassis 75. Upper and lower mold frames 73 and 65 are provided to upper and lower portions of the backlight assembly 70, respectively. The upper and lower mold frames 73 and 65 are designed to fix the components of the backlight assembly 70 relative to each other.

The light source 77 emits light. Still referring to FIG. 1, a lamp is used as the light source 77 in exemplary embodiments, but the present invention is not limited thereto. Alternatively, other types of light sources may be used.

The light source 77 is electrically connected to an inverter (not shown) so as to be applied with a driving voltage therefrom. The inverter converts an external voltage to a predetermined driving voltage level and applies the driving voltage to the light source 77 in order to drive the light source 77.

The light source cover 78 protects the light source 77. An inner portion of the light source cover 78 is coated with a light reflective material to minimize a loss of light emitted from the light source 77.

The light emitted from the light source 77 enters the light guiding plate 74. In general, the light guiding plate 74 is made of polymethyl methacrylate (PMMA). Alternatively, other materials may be used. The light entering the light guiding plate 74 is uniformly diffused to emit light in an upward direction (Z-axis direction). Namely, the light emits through a light emitting surface 74a of the light guiding plate 74. A portion of the light entering the light guiding plate 74 is reflected on the reflecting sheet 79, thus minimizing the loss of light.

As shown in the enlarged circle of FIG. 1, a plurality of prisms 741b are disposed on a surface 74b opposite the light emitting surface 74a of the light guiding plate 74 and facing the reflecting sheet 79. The prisms 741b have a function of improving light focusing efficiency. Namely, the prisms 741b focus the light emitted from the light source 77 so as to improve the light focusing efficiency. For this reason, the prisms 741b are disposed in a direction intersecting the longitudinal direction of the light source 77. Haze may be formed in the prisms 741b.

Although the plurality of prisms 741b are disposed on the surface 74b of the light guiding plate 74, this is merely to illustrate the present invention and the present invention is not limited thereto. Alternatively, the prisms 741b may not be disposed on surface 74b.

Figure 2:
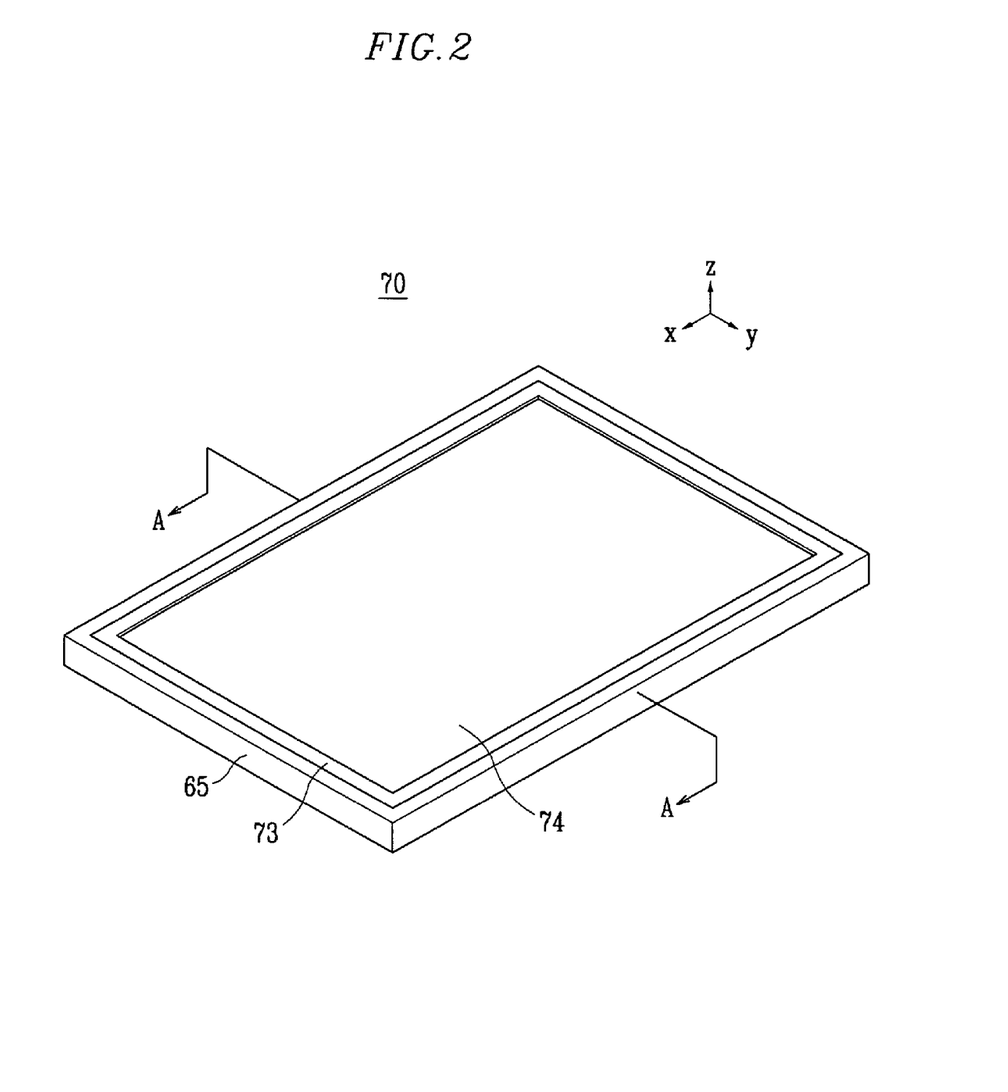
FIG. 2 is a perspective assembled view of the backlight assembly shown in FIG. 1.

FIG. 2 shows an assembled state of the backlight assembly shown in FIG. 1. As shown in FIG. 2, the upper mold frame 73 is inserted into the lower mold frame 65, so that the backlight assembly 70 is assembled. The light guiding plate 74 of the backlight assembly 70 is exposed so as to emit light outward from surface 74a.

Figure 3:
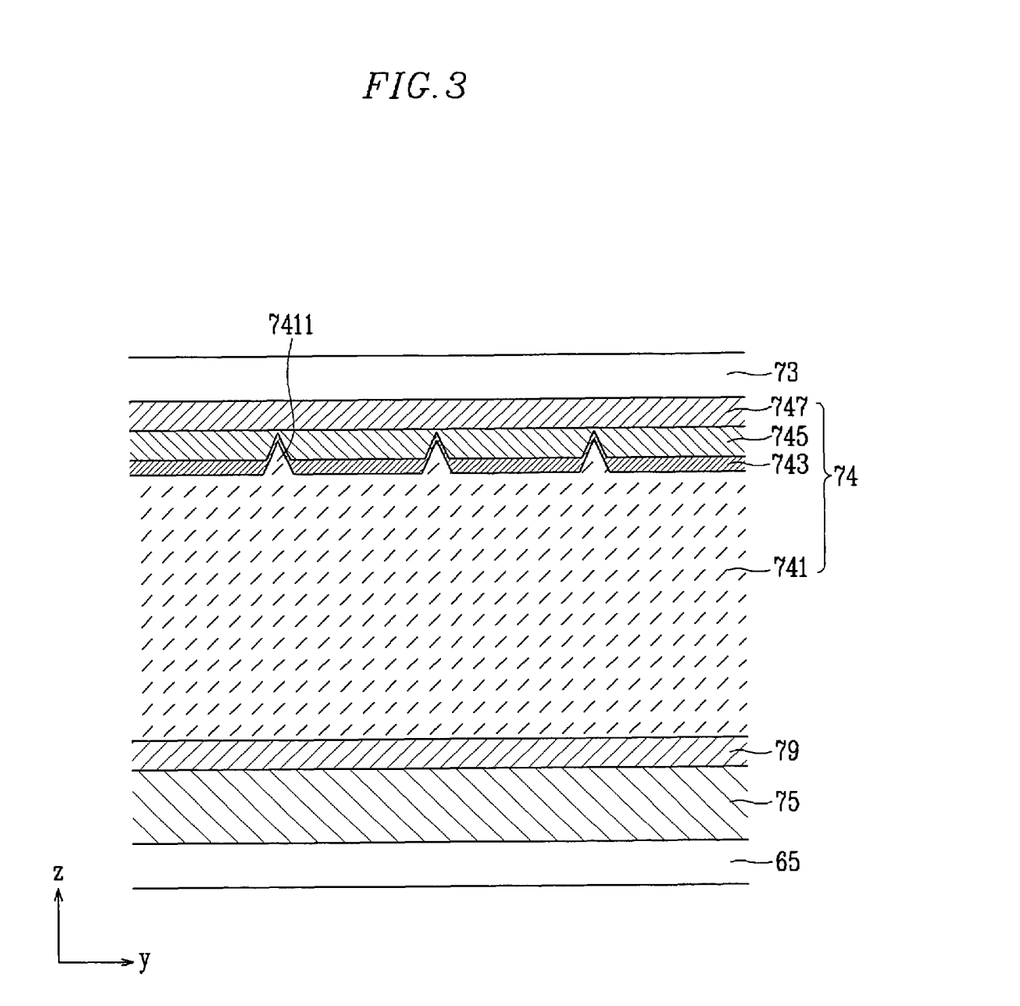
FIG. 3 is an enlarged partial cross-sectional view taken along line A-A of FIG. 2.

FIG. 3 shows an enlarged partial cross-sectional view of the backlight assembly 70 taken along line A-A of FIG. 2.

Referring to FIG. 3, the light guiding plate 74 includes a light guiding plate body 741, a polarization transformation layer 743 and a polarization extraction layer 745. The light guiding plate 74 may further include a protective layer 747, as illustrated in FIG. 3, for protecting the polarization extraction layer 745 as needed.

As a main component of the light guiding plate 74, the light guiding plate body 741 is made of PMMA. Alternatively, the light guiding plate body 741 may be made of other materials.

The polarization transformation layer 743 is stacked on a surface of the light guiding plate body 741. The polarization transformation layer 743 transforms a polarization component of the light emitted through the light guiding plate 74. The polarization transformation layer 743 has a plurality of refractive indexes varying according to direction. Namely, the polarization transformation layer 743 has anisotropy.

It is preferable that a difference between first and second refractive indexes of the refractive indexes is in a range from about 0.01 to about 0.50. If the difference between the first and second refractive indexes is less than about 0.01, birefringence does not easily occur, so that it is difficult to transform the polarization component of the light. If the difference between the first and second refractive indexes is more than about 0.05, the loss of light is too large due to the large difference of the refractive indexes. Preferably, the first refractive index is in a range from about 1.0 to about 2.0, and the second refractive index is in a range from about 1.0 to about 2.5. In the ranges of the first and second refractive indexes, it is possible to maximize the polarization transformation efficiency.

Light incident on polarization transformation layer 743 is subject to birefringence. During the birefringence, the polarization component is transformed. A retardation film may be used as the polarization transformation layer 743. The retardation film may include at least one resin selected from a group consisting of poly ethylene terephthalate (PET) and poly ethylene naphthalate (PEN). Since these resins have anisotropy, the resins are suitable for birefringence.

A plurality of refractive members 7411 are formed in a surface of the light guiding plate 74 so as to effectively precipitate the polarization transformation of the polarization transformation layer 743. The refractive members 7411 are separated from each other and protrude in one direction. The refractive members 7411 are disposed to extend parallel to the longitudinal direction of the light source 77. Light passing through the refractive members 7411 are subject to birefringence in various directions. As a result, the polarization transformation of the polarization transformation layer 743 can be easily performed.

The polarization extraction layer 745 is stacked on the polarization transformation layer 743 to extract only the light polarized in a predetermined direction. Namely, the polarization extraction layer 745 passes the light polarized in the predetermined direction, and the light polarized in other directions is reflected in total. In the polarization extraction layer 745, the light is subject to birefringence, so that the polarization in the predetermined direction can be easily extracted. Since the polarization extraction layer 745 has anisotropy, the polarization in the predetermined direction can be easily extracted. The polarization extraction layer 745 may include a plurality of liquid crystal polymers ("LCPs") further facilitating extraction of the polarization in the predetermined direction.

A protective layer 747 is stacked on the polarization extraction layer 745 to protect the polarization extraction layer 745. In a case where the polarization extraction layer 745 includes the liquid crystal polymers, the protective layer 747 may be used to fix the liquid crystal polymers.

Figure 4:
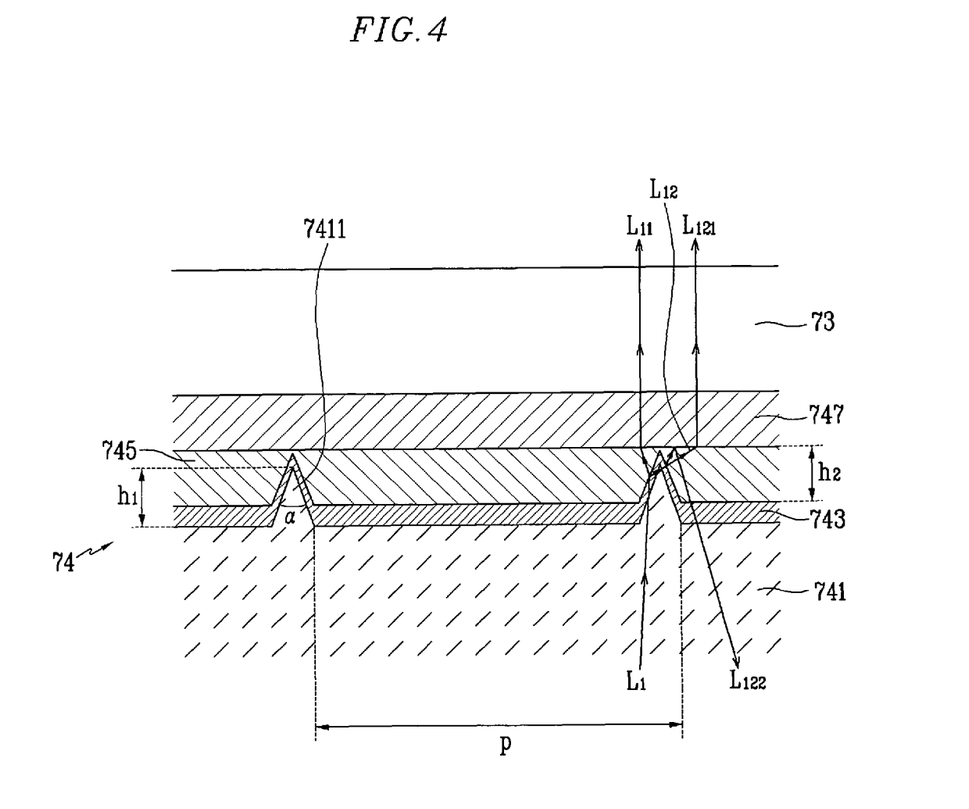
FIG. 4 is a partial enlarged view of FIG. 3.

FIG. 4 shows a partial enlarged view of an upper portion of FIG. 3, where light propagation directions are indicated by arrows.

Preferably, a height $h_1$ of the refractive member 7411 is in a range from about 5 μm to about 12 μm. If the height $h_1$ of the refractive member 7411 is less than 5 μm, the birefringence of the light does not easily occur. Therefore, it is difficult to transform the polarization. On the other hand, it is impossible to implement the light guiding plate 74 with the refractive members 7411 having a height $h_1$ which is more than about 12 μm.

Preferably, a vertex angle α of the refractive member 7411 is in a range from about 30 degrees to about 70 degrees. If the vertex angle α of the refractive member 7411 is less than 30 degrees, the light is incident on the refractive member 7411 substantially without an angle difference, refraction of light is very small. If the vertex angle α of the refractive member 7411 is more than 70 degrees, the light passing through the light guiding plate body 741 decreases due to total reflection thereon.

Preferably, a pitch p of the plurality of refractive members 7411 is in a range from about 10 μm to about 100 μm. If the pitch p of the refractive members 7411 is less than 10 μm, the refraction of light in the refractive members 7411 is so large that the loss of light is large. If the pitch p of the refractive members 7411 is more than about 100 μm, the birefringence in the refractive members 7411 is small. In addition, by adjusting the pitch p, it is possible to improve brightness.

The height $h_1$ of the refractive member 7411 is designed to be larger than a height $h_2$ of the polarization extraction layer 745. As a result, the birefringence in the refractive members 7411 is maximized. Preferably, the height $h_2$ of the polarization extraction layer 745 is about 0.25 times a wavelength of light.

In FIG. 4, the arrows indicate propagation directions $L_1$ of the light. The propagation directions of light are exemplary ones, but the present invention is not limited thereto. Therefore, other propagation directions of light may be used. In addition, when the refractive members 7411 are not present, only the polarization in a predetermined direction may emit when using only the polarization transformation layer 743 and the polarization extraction layer 745.

Although not shown in FIG. 4, the light emitting from the light source enters the light guiding plate 74. The light entering the light guiding plate 74 is diffused in the light guiding plate 74 to propagate in the upward direction toward surface 74a. The prisms disposed on the surface 74b opposite to the light emitting surface 74a of the light guiding plate 74 focus the light and emit the light to the light emitting surface 74a. Therefore, the light $L_1$ propagates in the directions shown in FIG. 4.

The light $L_1$ emitted from the light source 77 passes through the light guiding plate body 741 to be incident on the polarization transformation layer 743. Since the polarization transformation layer 743 has anisotropy, the light $L_1$ is divided into two lights $L_{11}$ and $L_{12}$. Due to the birefringence of the light $L_1$, the phase difference varies, so that the polarization component is transformed.

Since the light $L_{11}$ has only the S polarization component, the light $L_{11}$ passes through the polarization transformation layer 743 as it is, so that it emits in the upward direction. On the other hand, the light $L_{12}$ has P and S polarization components. The light $L_{12}$ is refracted in the polarization transformation layer 743, so the polarization component of the light $L_{12}$ is transformed. More specifically, the P polarization component rotates to be converted to the S polarization component, so that the polarization transformation occurs. Due to the polarization transformation, the P polarization component is transformed into a sum of the P and S polarization components.

The light $L_{122}$ having the P polarization component among the polarization-transformed light is reflected in total on the polarization extraction layer 745 to reenter the light guiding plate 74. On the other hand, the light $L_{121}$ having the S polarization component among the polarization-transformed light passes through the polarization extraction layer 745 to emit the polarization-transformed light in the upward direction. By using the polarization extraction layer 745, only the S polarization component can emit in the upward direction.

As described above, after the P polarization components are totally transformed to the S polarization components, the light emits. Therefore, since the polarization component (e.g., P polarization component) that cannot be used in a conventional backlight assembly can be extracted, it is possible to greatly increase the light efficiency.

Figure 5:
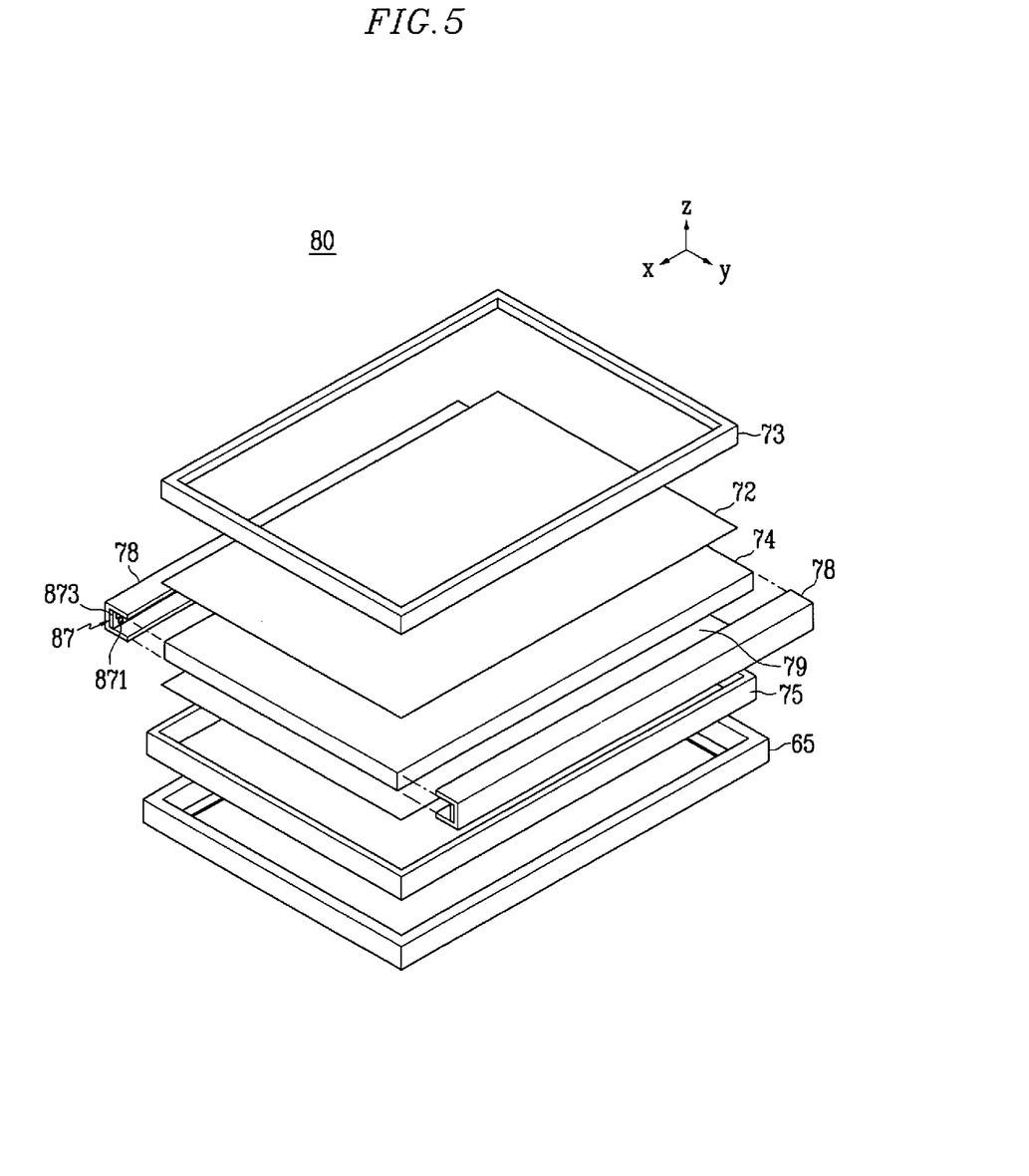
FIG. 5 is a perspective exploded view of another exemplary embodiment of a backlight assembly according to the present invention.

FIG. 5 shows a perspective exploded view of another exemplary embodiment of a backlight assembly 80 according to the present invention. The backlight assembly 80 according to this exemplary embodiment of the present invention shown in FIG. 5 is similar to the exemplary backlight assembly shown in FIG. 1. The same reference numerals denote the same elements, and therefore detailed description thereof is omitted.

In the exemplary embodiment of backlight assembly 80 of FIG. 5 according to the present invention, a linear light source 87 including light emitting diodes is used as a light source. The linear light source 87 is constructed by mounting a plurality of red (R), green (G), blue (B) and white (W) light emitting diodes 871 on a metal core printed circuit board ("MCPCB") 873. The light emitting diodes used in the linear light source 87 release a relatively small amount of heat, thus increasing a lifecycle thereof.

In addition, the backlight assembly 80 may further include a protective sheet 72 for protecting the polarization transformation layer and the polarization extraction layer. The protective sheet 72 has a function of protecting the light guiding plate 74 from an external impact.

Figure 6:
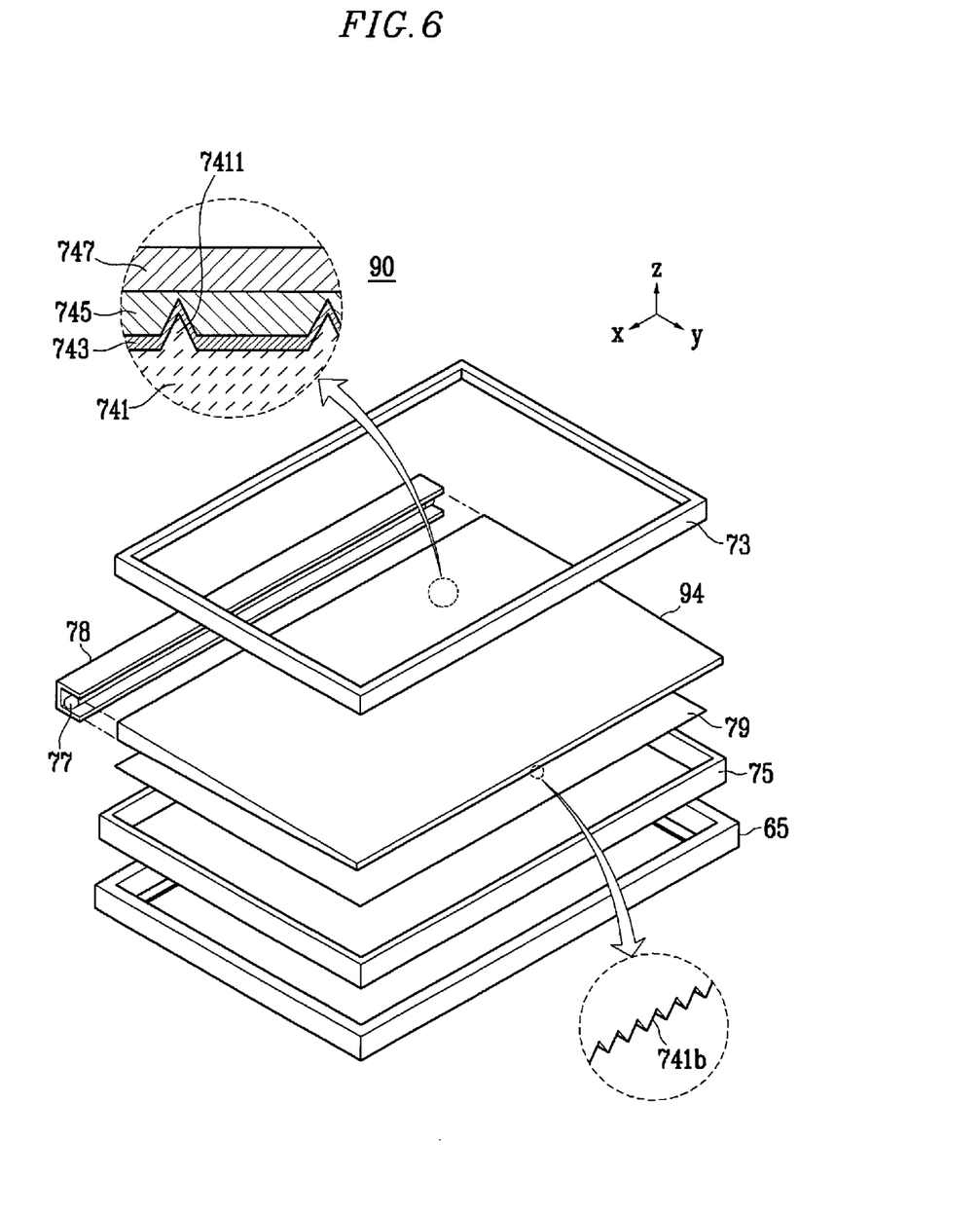
FIG. 6 is a perspective exploded view of yet another exemplary embodiment of a backlight assembly according to the present invention.

FIG. 6 shows a perspective exploded view of yet another exemplary embodiment of a backlight assembly according to the present invention. The backlight assembly 90 according to this exemplary embodiment of the present invention shown in FIG. 6 is similar to the backlight assembly according to the exemplary embodiment shown in FIG. 1. The same reference numerals denote the same elements, and therefore detailed description thereof is omitted.

The backlight assembly 90 is of a wedge type, where the light guiding plate 94 has a slanted or tapered structure. In this structure, the light source 77 is provided at only one side of the light guiding plate 94 to emit the light to be incident on one side of the light guiding plate 94.

As shown in upper and lower enlarged circles of FIG. 6, the structures of the light emitting surface (upper enlarged circle) and the opposite surface (lower enlarged circle) of the light guiding plate 94 are the same as those of the light guiding plate shown in FIGS. 4 and 1, respectively. Therefore, by using the light guiding plate 94, it is possible to greatly increase the light efficiency.

A plurality of prisms 741b are disposed on a lower surface of the light guiding plate 94 to focus the light. If a focused light distribution of the light guiding plate 94 having the plurality of prisms 741b were graphed, the graph would reflect a half width angle in a horizontal angle distribution to be 83 degrees, and a half width angle in a vertical angle distribution to be 27 degrees. Therefore, focus in the vertical direction can be efficiently implemented.

Figure 7:
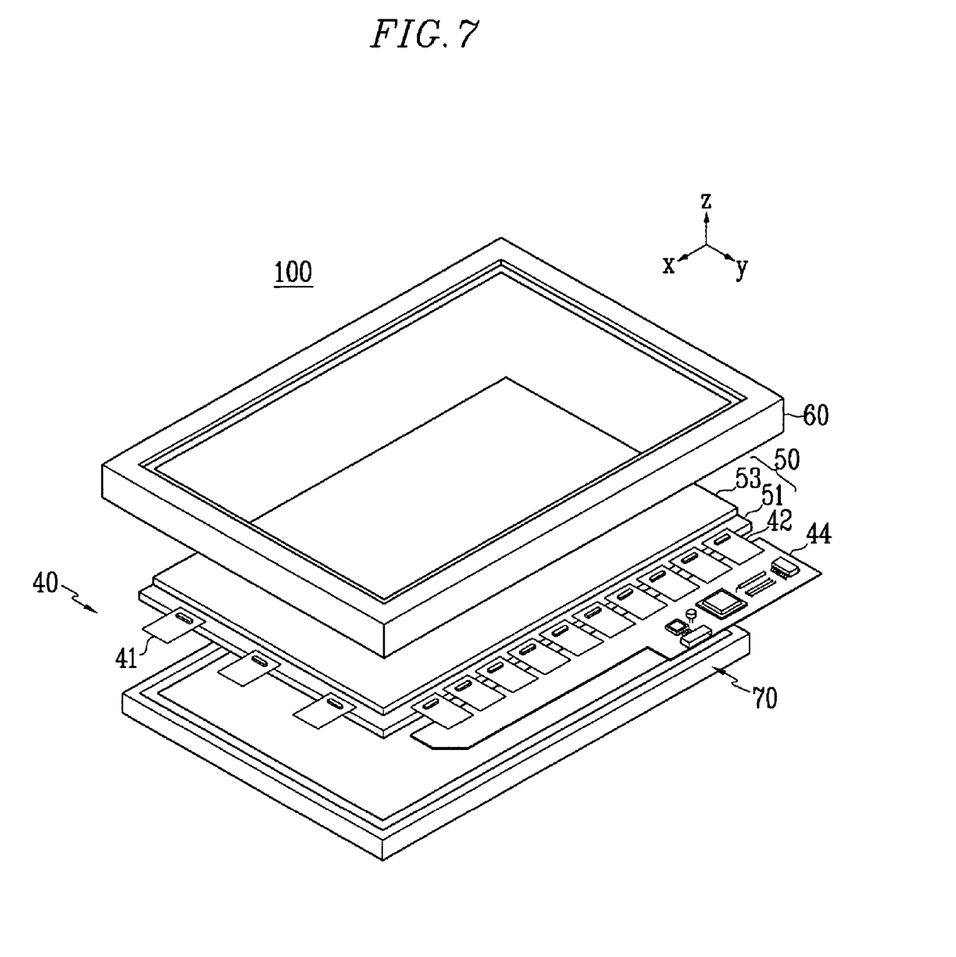
FIG. 7 is a perspective exploded view of an exemplary embodiment of a display device having the backlight assembly of FIGS. 1 and 2 according to the present invention.

FIG. 7 shows a display device 100 having the backlight assembly 70 of FIG. 1 according to the present invention. Although FIG. 7 shows the backlight assembly 70 shown in FIG. 1, the backlight assembly is an exemplary one of the present invention, and the present invention is not limited thereto. Therefore, the backlight assemblies according to the other exemplary embodiments of the present invention can used for the display apparatus.

The panel unit 50 may employ a liquid crystal display panel. The liquid crystal display panel is an exemplary one of the present invention, and the present invention is not limited thereto. It is possible to use other panels if necessary.

The display device 100 includes the panel unit 50 and the backlight assembly 70. The panel unit 50 is securely fixed on the backlight assembly 70 by using a top chassis 60. A panel unit assembly 40 includes the panel unit 50, driver integrated circuit ("IC") packages 41 and 42, and printed circuit boards ("PCBs") 44. As an example of the driver IC packages, chip on film ("COF"), tape carrier package ("TCP"), or the like may be used. The PCBs 44 may be enclosed by a side surface of the top chassis 60.

The panel unit 50 includes a thin film transistor ("TFT") panel 51 including a plurality of TFTs, a color filter panel 53 disposed over the TFT panel 51, and liquid crystal molecules (not shown) injected between the panels 51 and 53. Polarizing plates are attached on an upper portion of the color filter panel 53, and a lower portion of the TFT panel 51 to polarize light passing through the panel unit 50.

The TFT panel 51 is a transparent glass substrate where the TFTs are arrayed substantially in a matrix. A source port of each TFT is connected to a data line, and a gate port thereof is connected to a gate line. A drain port of each TFT is connected to a pixel electrode made of a transparent conductive material such as indium tin oxide (ITO).

When electric signals of the PCBs 44 are input to the gate lines and data lines of the panel unit 50, the electric signals are transmitted to the gate and source ports of the TFT. According to the input of the electric signals, the TFT turns on of off, so that an electric signal for forming an image is output to the drain port thereof.

On the other hand, the color filter panel 53 is disposed to face the TFT panel 51. The color filter panel 53 is a panel where RGB filters are formed by using a thin film formation process. The RGB filters represent predetermined colors when light passes through the filters. A common electrode made of ITO is disposed on the entire surface of the color filter panel 53. When a power is supplied to the gate and source ports to turn on the TFT, an electric field is generated between the pixel electrode of the TFT panel 51 and the common electrode of the color filter panel 53. Due to the electric field, alignment angles of the liquid crystal molecules injected between the TFT panel 51 and the color filter panel 53 change, so that transmittance of light through the panels 51 and 53 changes. As a result, a desired image can be obtained.

The printed circuit boards 44 which receive external image signals and apply driving signals to the gate and data lines are connected to the driver IC packages 41 and 42 attached to the panel unit 50. In order to drive the display device 100, the PCBs 44 transmit gate driving signals and data driving signals. Namely, the gate and data driving signals are applied through the driver IC packages 41 and 42 to the gate and data lines, respectively, of the panel unit 50. A control board (not shown) is disposed on a rear surface of the backlight assembly 70. The control board is connected to the PCBs 44 to convert analog data signals to digital data signals and apply the digital data signals to the panel unit 50.

Figure 8:
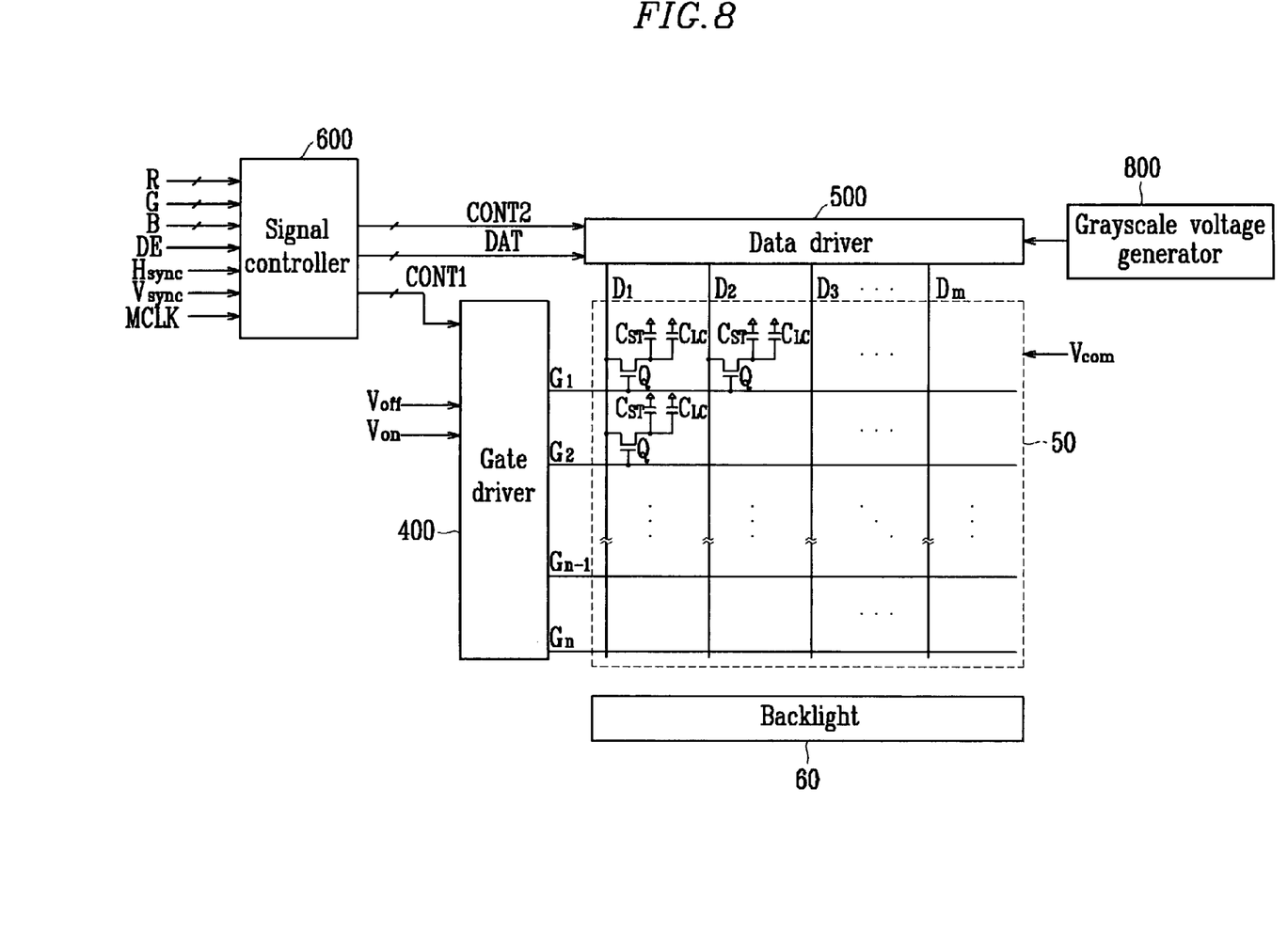
FIG. 8 is a block diagram showing a construction of a panel unit included in the display device of FIG. 7.
Figure 9:
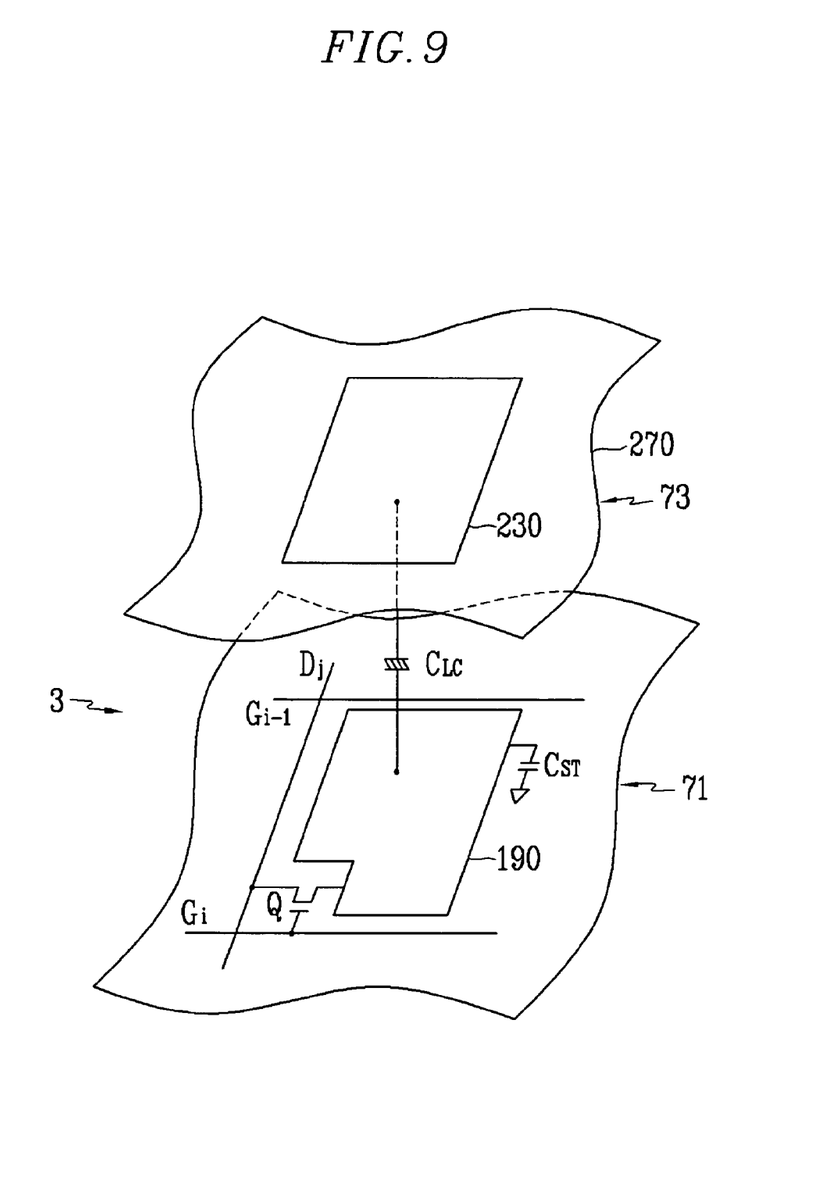
FIG. 9 is an equivalent circuit schematic diagram of a pixel of the panel unit of FIG. 8.

Now, operations of the panel unit 50 will be described with reference to FIGS. 8 and 9.

The TFT panel 51 includes a plurality of display signal lines $G_1$ to $G_n$ and $D_1$ to $D_m$. The TFT panel 51 also includes a plurality of pixels PX which are connected to a plurality of the display signal lines $G_1$ to $G_n$ and $D_1$ to $D_m$ and arrayed substantially in a matrix.

The display signal lines $G_1$ to $G_n$ and $D_1$ to $D_m$ include a plurality of gate lines $G_1$ to $G_n$ for transmitting gate signals (sometimes, referred to as "scan signals") and a plurality of data lines $D_1$ to $D_m$ for transmitting data signals. The gate lines $G_1$ to $G_n$ extend substantially parallel to each other substantially in a row direction, and the data lines $D_1$ to $D_m$ extend substantially parallel to each other substantially in a column direction.

Each of the pixels PX includes a switching device Q connected to the display signal lines $G_1$ to $G_n$ and $D_1$ to $D_m$, a liquid crystal capacitor $C_{LC}$ connected thereto and a storage capacitor $C_{ST}$. The storage capacitor $C_{SR}$ may be omitted as needed.

The switching device Q is a three-port device such as a TFT disposed in the TFT panel 51 and having a control port connected to one of the gate lines $G_1$ to $G_n$, an input port connected to the data line $D_1$ to $D_m$, and an output port connected to the liquid crystal capacitor $C_{LC}$ and the storage capacitor $C_{ST}$.

Two ports of the liquid crystal capacitor $C_{LC}$ are a pixel electrode 190 of the TFT panel 51 and a common electrode 270 of the color filter panel 53. The liquid crystal layer 3 is interposed between the two electrodes 190 and 270 and serves as a dielectric member. The pixel electrode 190 is connected to the switching device Q, and the common electrode 270 is disposed in the entire surface of the color filter panel 53 to receive a common voltage $V_{com}$. Alternatively, the common electrode 270 may be disposed at the TFT panel 51, and in this case, at least one of the two electrodes 190 and 270 may be formed in a shape of a line or a bar.

The storage capacitor $C_{ST}$ having an auxiliary function for the liquid crystal capacitor $C_{LC}$ is constructed by overlapping a separate signal line (not shown) and the pixel electrode 190 provided at the TFT panel 51 with an insulating member interposed therebetween, and a predetermined voltage, such as the common voltage $V_{com}$, is applied to the separate signal line. However, the storage capacitor $C_{ST}$ may alternatively be constructed by overlapping the pixel electrode 190 and a front gate line disposed just above with an insulting member interposed therebetween.

The signal controller 600 receives input image signals R, G and B and input control signals for controlling display thereof from an external graphic controller (not shown). As an example of the input control signals, there are a vertical synchronization signal Vsync, a horizontal synchronization signal Hsync, a main clock MCLK and a data enable signal DE. The signal controller 600 processes the input image signals R, G and B according to an operating condition of the panel unit 50 (see FIG. 8) based on the input control signals and the input image signals R, G and B to generate a gate control signal CONT1, a data control signal CONT2, and the like. Subsequently, the signal controller 600 transmits the generated gate control signal CONT1 to the gate driver 400 and the generated data control signal CONT2 and the processed image signal DAT to the data driver 500.

The gate control signal CONT1 includes a scan start signal STV for indicating output start of the gate-on voltage $V_{on}$ and at least one clock signal for controlling an output period of the gate-on voltage $V_{on}$ and an output voltage.

The data control signal CONT2 includes a horizontal synchronization start signal STH for indicating transmission start of the image data DAT, a load signal LOAD for commanding to apply the associated data voltages to the data lines $D_1$ to $D_m$, and a data clock signal HCLK. The data control signal CONT2 also includes an inversion signal RVS for inverting a voltage polarity of the data signal with respect to the common voltage $V_{com}$ (hereinafter, "the voltage polarity of the data signal with respect to the common voltage $V_{com}$" being abbreviated to a "data signal polarity").

In addition to the control signals CONT1 and CONT2, the signal controller 600 may transmit other control signals and clock signals to the backlight assembly 70 for controlling the operations of the backlight assembly 70.

In response to the data control signal CONT2 from the signal controller 600, the data driver 500 sequentially receives and shifts the digital image data DAT for one pixel row and selects the grayscale voltages corresponding to the digital image data DAT from the grayscale voltages supplied by the grayscale voltage generator 800, so that the image data DAT are converted into the associated data voltages. The data voltages are then applied to the associated data lines $D_1$ to $D_m$.

The gate driver 400 applies the gate-on voltage $V_{on}$ to the gate lines $G_1$ to $G_n$ according to the gate control signals CONT1 from the signal controller 600 to turn on the switching devices Q connected to the gate lines $G_1$ to $G_n$. As a result, the data voltages applied to the data lines $D_1$ to $D_m$ are applied to the associated pixels PX through the turned-on switching devices Q.

A difference between the data voltages applied to the pixel PX and the common voltage $V_{com}$ becomes a charge voltage of the liquid crystal capacitors $C_{LC}$, that is, a pixel voltage. Alignment of the liquid crystal molecules varies according to the intensity of the pixel voltage.

In units of one horizontal period (or 1H), that is, one period of the horizontal synchronization signal Hsync, the data deriver 500 and the gate driver 400 repetitively perform the aforementioned operations for the next pixel. In this manner, during one frame, the gate-on voltages $V_{on}$ are applied to all of the gate lines $G_1$ to $G_n$, so that the data voltages are applied to all of the pixels. When one frame ends, the next frame starts, and a state of the inversion signal RVS applied to the data driver 500 is controlled, so that the polarity of the data signal applied to each of the pixels is opposite to the polarity in the previous frame (frame inversion). At this time, even in one frame, according to the characteristics of the inversion signals RVS, the polarity of the data signal flowing through the one data line may be inverted (row inversion and dot inversion). In addition, the polarities of the data signals applied to the one pixel row may be different form each other (column inversion and dot inversion).

In a backlight assembly according to the present invention, since a light guiding plate includes a polarization transformation layer and a polarization extraction layer, 100% of the polarization components can be used to emit light, so that it is possible to greatly increase light efficiency.

In addition, since a plurality of refractive members protrude from a surface of a light guiding plate body, birefringence of light can be easily implemented.

In addition, since the polarization transformation layer has a plurality of refractive indexes varying according to directions, the polarization transformation can be easily implemented.

In addition, since the polarization transformation layer has a plurality of liquid crystal polymers, only the S polarization component can be passed, thus making it possible to increase the light efficiency.

Although the exemplary embodiments and the modified examples of the present invention have been described, the present invention is not limited to the exemplary embodiments and examples herein, but may be modified in various forms without departing from the scope of the appended claims, the detailed description, and the accompanying drawings of the present invention. Therefore, it is natural that such modifications belong within the scope of the present invention.

What is claimed is:

1. A light guiding plate comprising:
a light guiding plate body which directly inputs a light emitted from a light source;
a plurality of refractive members are disposed on a surface of the light guiding plate body, and extend in a predetermined direction normal to the surface of the light guiding plate body;
a polarization transformation layer disposed directly on the surface of the light guiding plate body and refractive members to transform a polarization component of light emitted through the light guiding plate body and the refractive members; and
a polarization extraction layer on the polarization transformation layer,
wherein refractive members are made of the same material as the light guiding plate body and the light guiding plate body, the polarization transformation layer, and the polarization extraction layer are made of different materials than each other.

2. The light guiding plate of claim 1, wherein the polarization transformation layer transforms a portion of a P polarization component into a S polarization component.

3. The light guiding plate of claim 1, wherein the polarization transformation layer allows the light to be subject to birefringence.

4. The light guiding plate of claim 1, wherein the polarization transformation layer is a retardation film.

5. The light guiding plate of claim 4, wherein the retardation film includes at least one resin selected from a group consisting of poly ethylene terephthalate (PET) and poly ethylene naphthalate (PEN).

6. The light guiding plate of claim 1, wherein a thickness of each of the refractive members is in a range from about 5 μm to about 12 μm.

7. The light guiding plate of claim 1, wherein a vertex angle of each of the refractive members is in a range from about 30° to about 70°.

8. The light guiding plate of claim 1, wherein a pitch of each of the refractive members is in a range from about 10 μm to about 100 μm.

9. The light guiding plate of claim 1, wherein the height of each of the refractive members is larger than a thickness of the polarization extraction layer.

10. The light guiding plate of claim 1, wherein the polarization transformation layer has a plurality of refractive indexes varying according to direction.

11. The light guiding plate of claim 1, wherein the polarization extraction layer includes a plurality of liquid crystal polymers (LCP).

12. The light guiding plate of claim 1, wherein the polarization transformation layer passes only an S polarization component.

13. The light guiding plate of claim 1, further comprising a protective layer which is stacked on the polarization extraction layer to protect the polarization extraction layer.

14. A backlight assembly comprising:
a light source; and
a light guiding plate for guiding a light emitted from the light source,
wherein the light guiding plate comprises:
a light guiding plate body which directly inputs the light emitted from the light source;
a plurality of refractive members are disposed on a surface of the light guiding plate body, and extend in a predetermined direction normal to the surface of the light guiding plate body;
a polarization transformation layer disposed directly on the surface of the light guiding plate body and refractive members to transform a polarization component of light emitted through the light guiding plate body and the refractive members; and
a polarization extraction layer on the polarization transformation layer,
wherein refractive members are made of the same material as the light guiding plate body and the light guiding plate body, the polarization transformation layer, and the polarization extraction layer are made of different materials than each other.

15. The backlight assembly of claim 14, wherein the polarization transformation layer transforms a portion of a P polarization component into a S polarization component.

16. The backlight assembly of claim 14, wherein the polarization transformation layer allows the light to be subject to birefringence.

17. The backlight assembly of claim 14, wherein the polarization transformation layer is a retardation film.

18. The backlight assembly of claim 17, wherein the retardation film includes at least one resin selected from a group consisting of poly ethylene terephthalate (PET) and poly ethylene naphthalate (PEN).

19. The backlight assembly of claim 14, wherein a thickness of each of the refractive members is in a range from about 5 μm to about 12 μm.

20. The backlight assembly of claim 14, wherein a vertex angle of each of the refractive members is in a range from about 30° to about 70°.

21. The backlight assembly of claim 14, wherein a pitch of the refractive members is in a range from about 10 μm to about 100 μm.

22. The backlight assembly of claim 14, wherein the height of each of the refractive members is larger than a thickness of the polarization extraction layer.

23. The backlight assembly of claim 14, wherein the light source and the plurality of the refractive members are disposed to extend in the same direction.

24. The backlight assembly of claim 14, wherein the polarization transformation layer has a plurality of refractive indexes varying according to direction.

25. The backlight assembly of claim 24, wherein a difference between first and second refractive indexes among the refractive indexes is in a range from about 0.01 to about 0.50.

26. The backlight assembly of claim 24, wherein the first refractive index is in a range from about 1.0 to about 2.0.

27. The backlight assembly of claim 24, wherein the second refractive index is in a range from about 1.0 to about 2.5.

28. The backlight assembly of claim 27, wherein the polarization extraction layer includes a plurality of liquid crystal polymers.

29. The backlight assembly of claim 27, wherein the polarization transformation layer passes only an S polarization component.

30. The backlight assembly of claim 27, further comprising a protective layer on the polarization extraction layer to protect the polarization extraction layer.

31. The backlight assembly of claim 14, wherein the light source is a lamp.

32. The backlight assembly of claim 14, wherein the light source is a linear light source including light emitting diodes.

33. A display device comprising:

a panel unit for displaying an image;

a light source for supplying light to the panel unit; and a light guiding plate for guiding a light emitted from the light source, wherein the light guiding plate comprises:

a light guiding plate body which directly inputs the light emitted from the light source;

a plurality of refractive members are disposed on a surface of the light guiding plate body, and extend in a predetermined direction normal to the surface of the light guiding plate body;

a polarization transformation layer disposed directly on the surface of the light guiding plate body and refractive members to transform a polarization component of light emitted through the light guiding plate body and the refractive members; and a polarization extraction layer on the polarization transformation layer, wherein refractive members are made of the same material as the light guiding plate body and the light guiding plate body, the polarization transformation layer, and the polarization extraction layer are made of different materials than each other.

34. The display device of claim 33, wherein the polarization transformation layer transforms a portion of a P polarization component into a S polarization component.

35. The display device of claim 33, wherein the polarization transformation layer allows the light to be subject to birefringence.

36. The display device of claim 33, wherein the polarization transformation layer is a retardation film.

37. The display device of claim 36, wherein the retardation film includes at least one resin selected from a group consisting of poly ethylene terephthalate PET and poly ethylene naphthalate PEN.

38. The display device of claim 33, wherein a thickness of each of the refractive members is in a range from about 5 μm to about 12 μm.

39. The display device of claim 33, wherein a vertex angle of each of the refractive members is in a range from about 30° to about 70°.

40. The display device of claim 33, wherein a pitch of the refractive members is in a range from about 10 μm to 100 μm.

41. The display device of claim 33, wherein the polarization transformation layer has a plurality of refractive indexes varying according to direction.

42. The display device of claim 33, wherein the polarization extraction layer includes a plurality of liquid crystal polymers.

43. The display device of claim 33, wherein the panel unit is a liquid crystal display panel.

44. The display device of claim 33, wherein the panel unit is disposed to directly face the light guiding plate.

45. The light guiding plate of claim 1, wherein the plurality of refractive members are separated from each other.

46. The light guiding plate of claim 14, wherein the plurality of refractive members are separated from each other.

47. The light guiding plate of claim 33, wherein the plurality of refractive members are separated from each other.

* * * * *